United States Patent [19]
Ernstoff et al.

[11] Patent Number: 5,903,323
[45] Date of Patent: *May 11, 1999

[54] FULL COLOR SEQUENTIAL IMAGE PROJECTION SYSTEM INCORPORATING TIME MODULATED ILLUMINATION

[75] Inventors: Michael N. Ernstoff; George C. Valley, both of Los Angeles; Steven E. Shields, San Diego, all of Calif.

[73] Assignee: Raytheon Company, El Segundo, Calif.

[ * ] Notice: This patent is subject to a terminal disclaimer.

[21] Appl. No.: 08/724,144

[22] Filed: Sep. 26, 1996

Related U.S. Application Data

[63] Continuation of application No. 08/360,870, Dec. 21, 1994, abandoned.

[51] Int. Cl.$^6$ .............................. H04N 5/74; H04N 9/12
[52] U.S. Cl. ..................... 348/771; 348/770; 348/742; 345/84; 345/148
[58] Field of Search ..................... 348/771, 770, 348/742, 443, 268–271, 758, 759, 776, 779, 781, 782, 760, 254, 815; 345/84, 148, 147; 359/443, 245; H04N 5/74, 9/31, 9/12

[56] References Cited

U.S. PATENT DOCUMENTS

| | | | |
|---|---|---|---|
| 4,611,889 | 9/1986 | Buzak | 350/347 R |
| 4,683,420 | 7/1987 | Goutzoulis | 324/73 R |
| 4,786,146 | 11/1988 | Ledebuhr | 350/331 R |
| 4,843,381 | 6/1989 | Baron | 340/784 |
| 5,214,420 | 5/1993 | Thompson et al. | 340/795 |
| 5,327,229 | 7/1994 | Konno et al. | 348/742 |
| 5,428,366 | 6/1995 | Eichenlaub | 345/102 |
| 5,448,314 | 9/1995 | Heimbach et al. | 348/743 |
| 5,668,611 | 9/1997 | Ernstoff et al. | 348/771 |

FOREIGN PATENT DOCUMENTS

| | | |
|---|---|---|
| A-0261896 | 3/1988 | European Pat. Off. . |
| A-0261897 | 3/1988 | European Pat. Off. . |
| A-0660693 | 6/1995 | European Pat. Off. . |
| WO-A9209064 | 5/1992 | WIPO . |
| WO-A9212506 | 7/1992 | WIPO . |
| WO-A9409473 | 4/1994 | WIPO . |

OTHER PUBLICATIONS

Claude Tew, "Electronic Control of a Digital Micromirror Device for Projection Displays", 1994, pp. 130–131.

Primary Examiner—Michael Lee
Attorney, Agent, or Firm—Leonard A. Alkov; William C. Schubert; Glenn H. Lenzen, Jr.

[57] ABSTRACT

A system and technique for directing intensity modulated electromagnetic energy. The inventive system (10) includes an intensity modulated source of electromagnetic energy (12). Individual elements (22) in an array of energy directing elements (15) are activated in sync with the modulation of energy source (12). In a particular implementation, the source (12) is a laser. The intensity of the laser is reduced during each successive field per frame. The energy directing elements (15), in this case—light directing elements, are implemented with an array of digital micromirrors. The light source (12) is modulated in intensity in accordance with a fixed modulation scheme. The mirrors (22) are selectively activated relative to the light source modulation scheme. Hence, the invention provides a gray scale output while allowing the time between mirror flips to be constant. This allows the system clocks to run synchronously and greatly simplifies the writing of data into the display as the time available for writing each bit is constant.

11 Claims, 6 Drawing Sheets

FULL COLOR SEQUENTIAL IMAGE PROJECTION SYSTEM INCORPORATING TIME MODULATED ILLUMINATION

This is a continuation application Ser. No. 08/360,870 filed Dec. 21, 1994 now abandoned.

BACKGROUND OF THE INVENTION

1. Field of the Invention:

The present invention relates to image projection systems. More specifically, the present invention relates to systems for projecting electronically described dynamic imagery on a large screen.

2. Description of the Related Art:

Many applications require electronically described images to be projected on large screens, with high brightness, high resolution, and full color. Several technologies utilized for this purpose are currently known in the art including: 1) cathode-ray tubes, 2) active matrix liquid crystal light valves, 3) photo-activated liquid crystal light values and 4) light valves that work by deflecting portions of the light falling onto them, such as the Digital Micromirror Device®.

Cathode ray tube devices are best known and most prevalent. These devices are used for numerous applications including television displays and computer monitors. A cathode ray tube can be described as consisting of an electron gun to produce a beam of electrons, focus and deflection circuitry to paint the electrons onto a series of points on its faceplate, and a phosphorescent faceplate screen. The impact of the electrons onto the molecules of the phosphor in the screen generates photons. An image is formed by electronically controlling how many electrons land at each point on the screen over a given period of time.

For those color applications where the screen can be viewed directly, three electron guns are generally packaged within one cathode ray tube in a manner such that the electrons from each gun impact only the phosphor of the color associated with its contribution to the image, red, green or blue. For those applications requiring large luminous flux to achieve high brightness on a large screen, three cathode-ray tubes are generally used so as to maximize the available brightness. Unfortunately, there is still a limit to the maximum brightness attainable as the intensity of the electron beams cannot be increased past the point where the phosphor screens are damaged.

Light valve projectors use a spatial light modulator to impart spatial and temporal modulation to light from a high intensity source. In a liquid-crystal light valve, the electrical voltage applied across the liquid crystal material is generally used to modulate the polarization of the optical wavefront from the light source, and by subsequently passing the modulated light through another polarizer, often called an analyzer, one can obtain a light beam whose intensity is related to the applied electrical voltage. In other light valves, tilting mirrors or other mechanical means are used to control whether or not the light from the lamp passes through an aperture stop and onto the screen.

In liquid crystal light valves, the electrical voltage applied across a thin film of liquid crystal material is modulated spatially and temporally so as change the optical properties of the liquid crystal material as a function of its location at any given instant in time. In an active-matrix liquid-crystal light value, the most prevalent type of liquid-crystal display at the present time, row and column electrodes are used to channel the electrical signals to the appropriate location at the desired point in time. In a photo-activated light valve (sometimes known as an Image Light Amplifier), a device expressly designed for projection applications, the image on the phosphor screen of a CRT is reimaged onto a photoconductor which in turn controls the electrical voltage applied across the film of liquid crystal material. Unfortunately, liquid-crystal light valve projectors are complex to manufacture, and the analog nature of the light modulation process makes it difficult to achieve high spatial and temporal uniformity.

Several groups have proposed using a micromachined device built on a silicon integrated circuit as a light valve. One example of such a device is the Digital Micromirror Device® (DMD). In one embodiment the DMD consists of a complementary metal-oxide semiconductor (CMOS) static random access memory (RAM) chip with an array of mirrors mounted over the surface of the chip such that there is a one-to-one relationship between each memory cell and a mirror. Each mirror has a deformable mount such that it can be tilted to one of two stable positions depending on the data stored in the corresponding memory cell. In the "on" position, for example, a mirror is tilted to allow light incident on the array to pass through a tiny aperture for projection onto a screen. In the "off" position, the mirror is not tilted, and incident light is reflected away from the projection aperture. Hence, by programming the tilt of each mirror in the array of mirrors as a function of time, spatial and temporal modulation may be imparted to the otherwise uniform illumination from the light source. With a suitable lens, the light reflected by the array of mirrors may be focused onto a screen for viewing.

Like other devices of its class, the DMD is digital, with each cell being either "on" or "off". Thus, some systems had to be developed to produce the gray scale required to create quality pictorial images. Gray scale image projection in these devices is effected currently by varying the amount of time that the mirror is tilted. In particular, the DMD currently uses a bit sequential method of displaying gray scale. The data for the most significant bit is displayed by tilting the mirror for ½ of the total frame time, the second most significant bit is displayed for ¼ the total frame time, and so on. Thus, for a system which uses an eight bit digital word to display video data at each pixel, if each bit is written immediately before it is displayed, the time available to write each bit nominally varies from ½ frame to $1/256$ [or $1/(2^8)$] of a frame, assuring 8-bit video which gives you seven steps in addition to fully "on" and "off".

In a recent article by Claud Tew et al. entitled "Electronic Control of a Digital Micromirror Device® for Projection Displays," published in the 1994 IEEE International Solid-State Circuits Conference, pp. 130–131, at least two different designs are described for Digital Micromirror Devices®. However, both of these involve pulse-width modulation implemented by rapidly flipping the mirrors back and forth to achieve gray scale images, images that appear to have regions whose brightness is between black and white. Image brightness is controlled by the period of time during which the mirror for a given unit cell or pixel is in the "on" position. In an eight bit system implementation, the shortest field period required is nominally 1/256 times as long as the frame period. During this time the system must be able to write the data for the next bit field (otherwise the DMD will not be ready to change state when required). With a typical frame rate of 1/60th of a second (consistent with US TV standards), the dimmest bit can be on for no more than 1/256 times 1/60th of a second. This presents speed problems which are exacerbated in larger arrays where perhaps 1080 lines of 1920 pixels (a proposed HDTV standard) must be addressed during each field. Color can be presented by using three DMDs, on for each primary color, or by using one device presenting the three colors sequentially. The later approach is less costly and thus more desirable, but it further exacerbates the speed problem by requiring everything to run three times faster.

Thus, there is a need in the art for an inexpensive system and technique for displaying electronically described images, possibly with high brightness (e.g. 5000 lumens), on a large screen. In particular, there is a need in the art for an inexpensive system and technique for displaying electronic images of varying intensity in color.

SUMMARY OF THE INVENTION

The need in the art is addressed by the present invention which, in a most general sense, provides a system and technique for directing intensity modulated electromagnetic energy. The invention includes an intensity modulated source of electromagnetic energy. Individual elements in an array of energy directing elements are activated in sync with the modulation of the energy source.

In a particular implementation, the source is a laser. The intensity of the laser is reduced during each successive field per frame. The energy directing elements, in this case—light directing elements, are implemented with an array of digital micromirrors. The light source is modulated in intensity in accordance with a fixed modulation scheme. The mirrors are selectively activated relative to the light source modulation scheme. The invention provides a gray scale output while allowing the time between mirror flips to be constant. This allows the system clocks to run synchronously and greatly simplifies the writing of data into the display as the time available for writing each bit is constant. The display of the present invention obviates the need for one of the buffer memories required at each pixel location by the systems of the related art, as there is no need to write multiple bits into a particular pixel.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
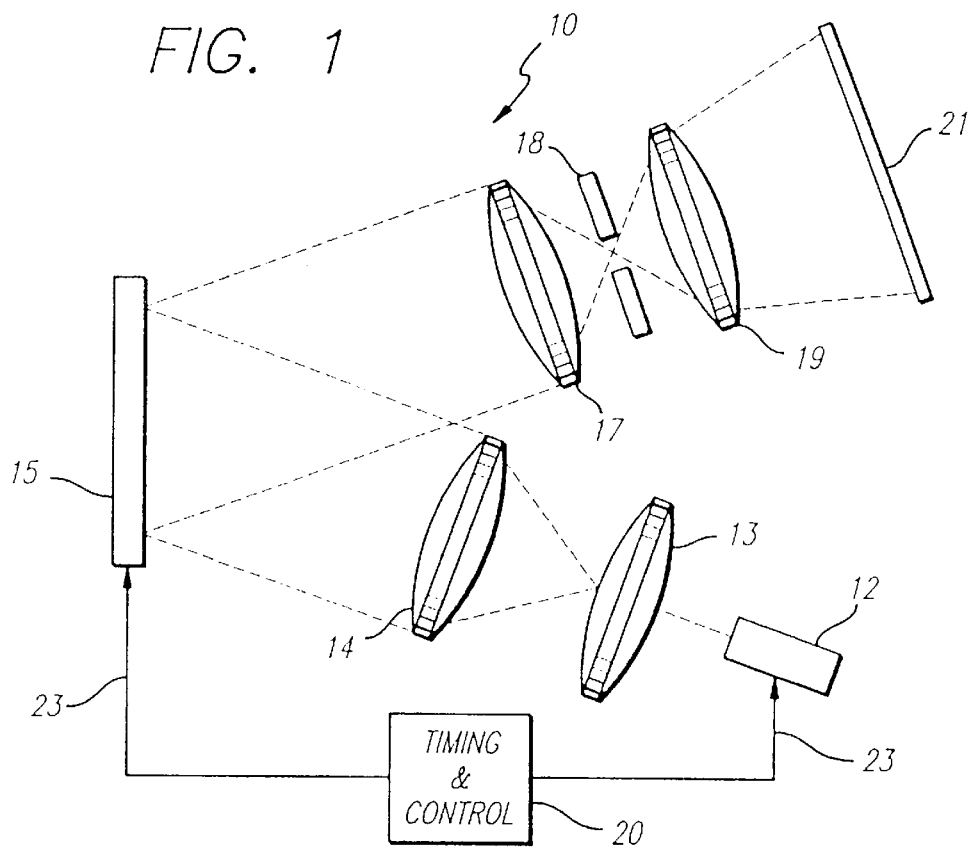
FIG. 1 is a diagram of illustrative embodiment of the image projection system of the present invention.

FIG. 1 is a diagram of an illustrative embodiment of the image projection system of the present invention. The system 10 includes a light source 12. The light source 12 should be one that can uniformly illuminate the array 15 of spatial light modulators and whose output can be modulated in intensity in a known and predictable manner. Hence, while in the illustrative embodiment, the light source 12 is implemented with a laser, the light source may be implemented with any other source which may be intensity modulated fast enough to perform gray scale encoding at video frame rates. The output of the laser is expanded by lenses 13 and 14 (or an alternative optical configuration) so as to fully and uniformly illuminate the spatial light modulator 15. In the preferred embodiment, the spatial light modulator 15 is a Digital Micromirror Device® (DMD) or other digital light modulator such as was described in the discussion of related art above. Although the following discussion assumes a DMD light valve, any light modulating device that generates gray scale by deflecting light into different directions such that it either passes through an aperture or does not pass through the aperture could be used.

As described in the above-referenced article entitled "Electronic Control of a Digital Micromirror Device® for Projection Displays," published in the 1994 edition of the IEEE International Solid-State Circuits Conference, p. 130–131, by Claude Tew et al., Digital Micromirror Devices® include a plurality of miniature mirrors suspended above the substrate of an integrated circuit chip. The tilt angle of each mirror may be controlled by an electronic signal.

Figure 2:
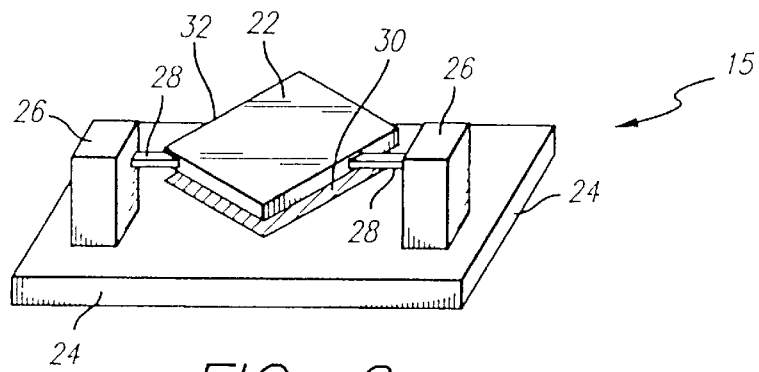
FIG. 2 is a schematic view of a single pixel from a DMD chip.

FIG. 2 is a schematic view of a single pixel from a DMD chip. As illustrated in FIG. 2, the DMD 15 includes a mirror element 22 which is suspended above a substrate 24. In the illustrated embodiment, each mirror element 22 is supported by two torsion hinges 28 and posts 26. Two electrodes 30 and 32 supply the electromotive forces to rotate the mirror 22 about the axis of the torsion hinges. To tilt the mirror 22 to a desired position, true and complementary data are supplied to the two electrodes 30 and 32. The resultant electrostatic force tips the mirror toward the desired position.

Figure 3A:
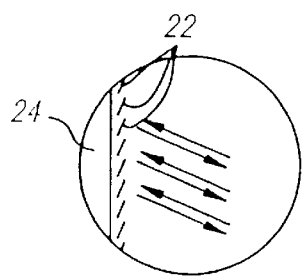
FIG. 3a shows the DMD mirror elements in an 'off' state.
Figure 3B:
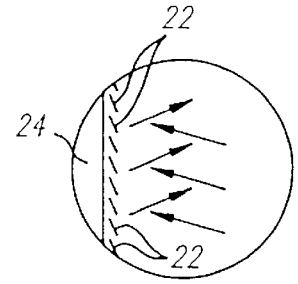
FIG. 3b shows the DMD mirror elements in an 'on' state.

FIGS. 3a and 3b are magnified cross-sectional schematic views of a section of the DMD 15. FIG. 3a shows the DMD mirror elements in an "off" state. FIG. 3b shows the DMD mirror elements in an "on" state. As shown in FIG. 3a, when the DMD elements are in an "off" state, the light energy is reflected back to the source 12. When the mirror elements are in an "on" state, as illustrated in FIG. 3b, the light is reflected at an angle such that the light is collected by the lens 17 of FIG. 1 and passes through an aperture or Schlieren stop 18 to be projected by the lens 19 onto the screen 21. Typically, the DMD picture element mirrors rotate from +10° to −10°. The optical characteristics of lenses 17 and 19 are selected to reimage the DMD mirror elements onto the screen 21. The role of the Schlieren stop in this application is analogous to the analyzer in a liquid crystal light valve; it converts the change in light direction into a change in light intensity.

A timing and control circuit 20 specifies and coordinates the changes in the intensity of the light source 12 in synchronism with the data input signals 23 to the DMD as discussed more fully below. The timing and control circuits effect the selective activation of the DMD elements as necessary to provide the desire gray scale intensity for each pixel on the screen 21.

Figure 4:
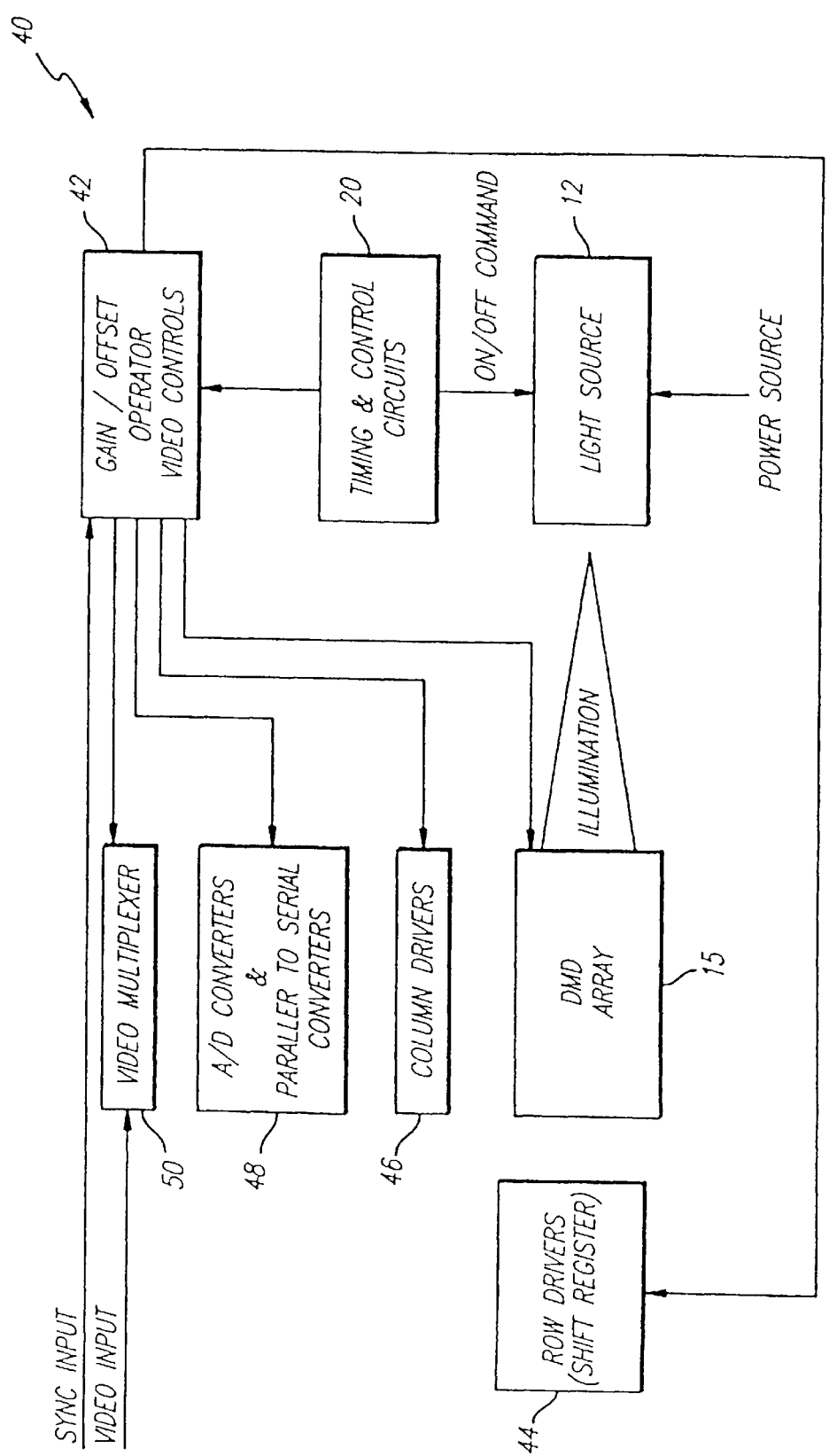
FIG. 4 is a block diagram of the electrical circuit of the image projection system of the present invention.

FIG. 4 is a block diagram of the electrical circuit 40 of the image projection system of the present invention. The illustrated embodiment provides for an analog video signal to be de-multiplexed by a video multiplexer 50 into numerous analog to digital (A/D) converters 48, e.g., one for each column of the DMD. A video gain and offset control circuit 42 provides contrast and brightness adjustment capability. (If the video is available in digital format, the de-multiplexing could be performed digitally and the A/D converters could be eliminated.) A frame of digital video information is then stored in an array of serial to parallel converters 48 until it is needed to drive the DMD. Column drivers 46 are provided to insure adequate capacity is available to drive the electrical load represented by the DMD 15. The row drivers 44 provide signals for sequential loading of each field of data into the DMD 15. The modulated light source 12 as well as each of the other blocks, is controlled by the timing and control circuits 20.

The illustrated embodiment provides for an array of parallel to serial converters to store of an entire frame of video data 48. The parallel to serial converters enable the most significant bit of each video word to be used to control the first field in the frame; the next most significant bit of each video word to be used to control the second field in the frame, and etc. The timing and control circuit 20, parallel to serial converters 48, gain and offset circuits 42, and column drivers 46, may be implemented with microprocessors, gate arrays or with discrete digital or analog circuits in a conventional manner. The functions may be partitioned so that some can be fabricated as part of the DMD.

The basic memory element controlling each mirror on the DMD can be assumed to be a simple flip-flop logic element (not shown). Each flip-flop has an input which determines the state it will assume after the second of two clock transitions; one clock transition loads in the new data and the next (opposite) clock transition changes the state of the flip-flop to correspond to the new data. Each mirror in the DMD array tilts in a manner corresponding to the state of its associate flip-flop.

The row driver 44 successively and sequentially places a row enable signal on each of the row electrode buses of the DMD array. All of the flip-flops (not shown) in any row of mirror elements (pixels) are loaded simultaneously with "on" or "off" instructions depending on the state of their corresponding column driver. By updating the data presented on each column electrode bus in synchronism with the row enable signal stepping down the rows of the DMD, new data can be loaded in the flip-flop associate with each picture element (pixel) a row at a time. By simultaneously transitioning all of the row enable buses in the opposite manner, all of the loaded data is transferred into all of the flip-flop memories on a one-to-one basis, and an electronic representation of a binary (black or white) image field is translated into a programmed pattern of mirror positions and corresponding bright and dark pixels. The process is repeated, one field for each video bit, until all the fields in the frame have been presented. The process is repeated each frame, but with the variation required to create the illusion of moving images.

Figure 5:
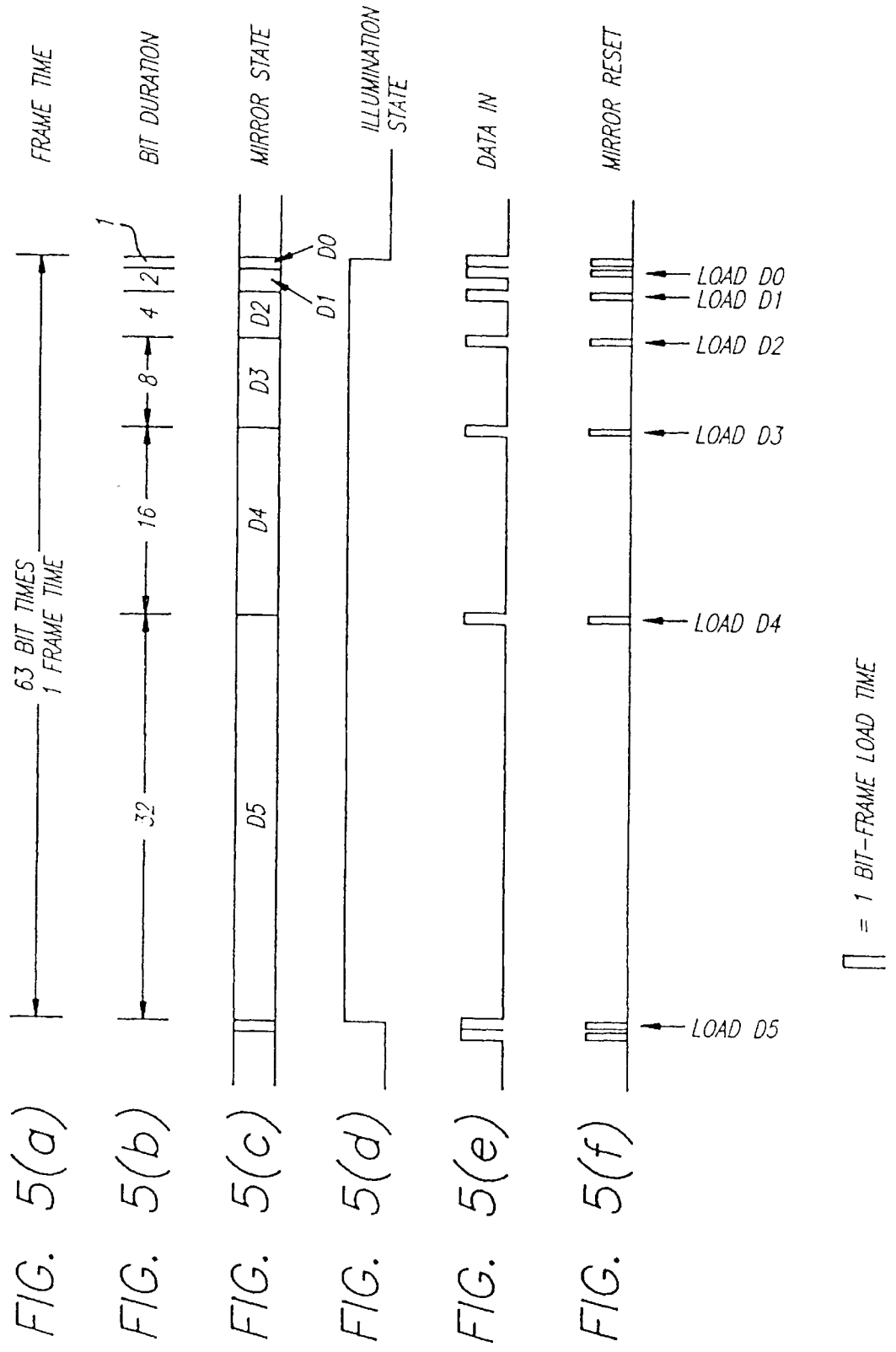
FIGS. 5(a)–(f) are timing diagrams of a typical conventional DMD based image projection system.
Figure 6:
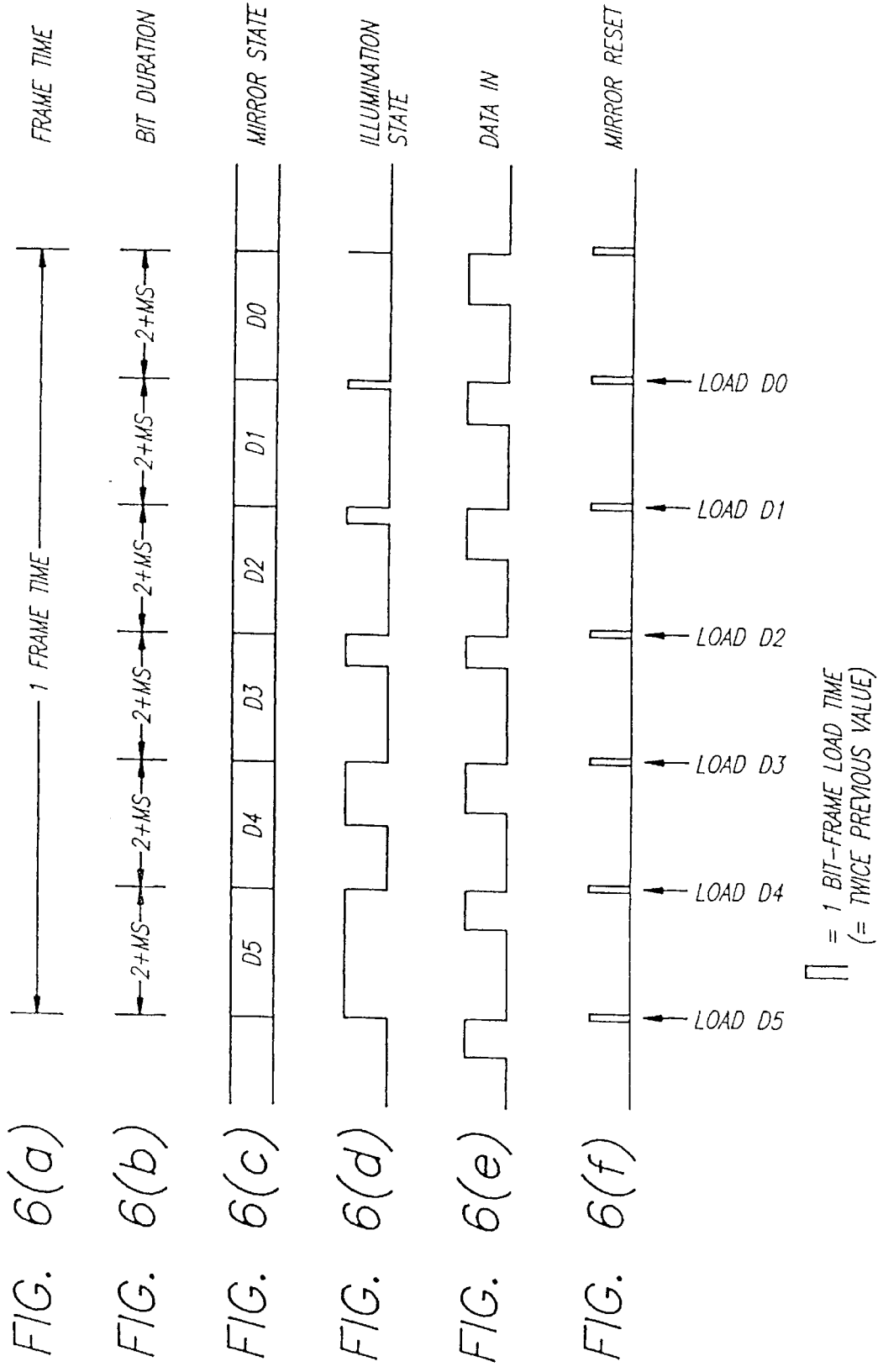
FIGS. 6(a)–(f) are timing diagrams of a display constructed and operated in accordance with the teachings of the present invention.
Figure 7:
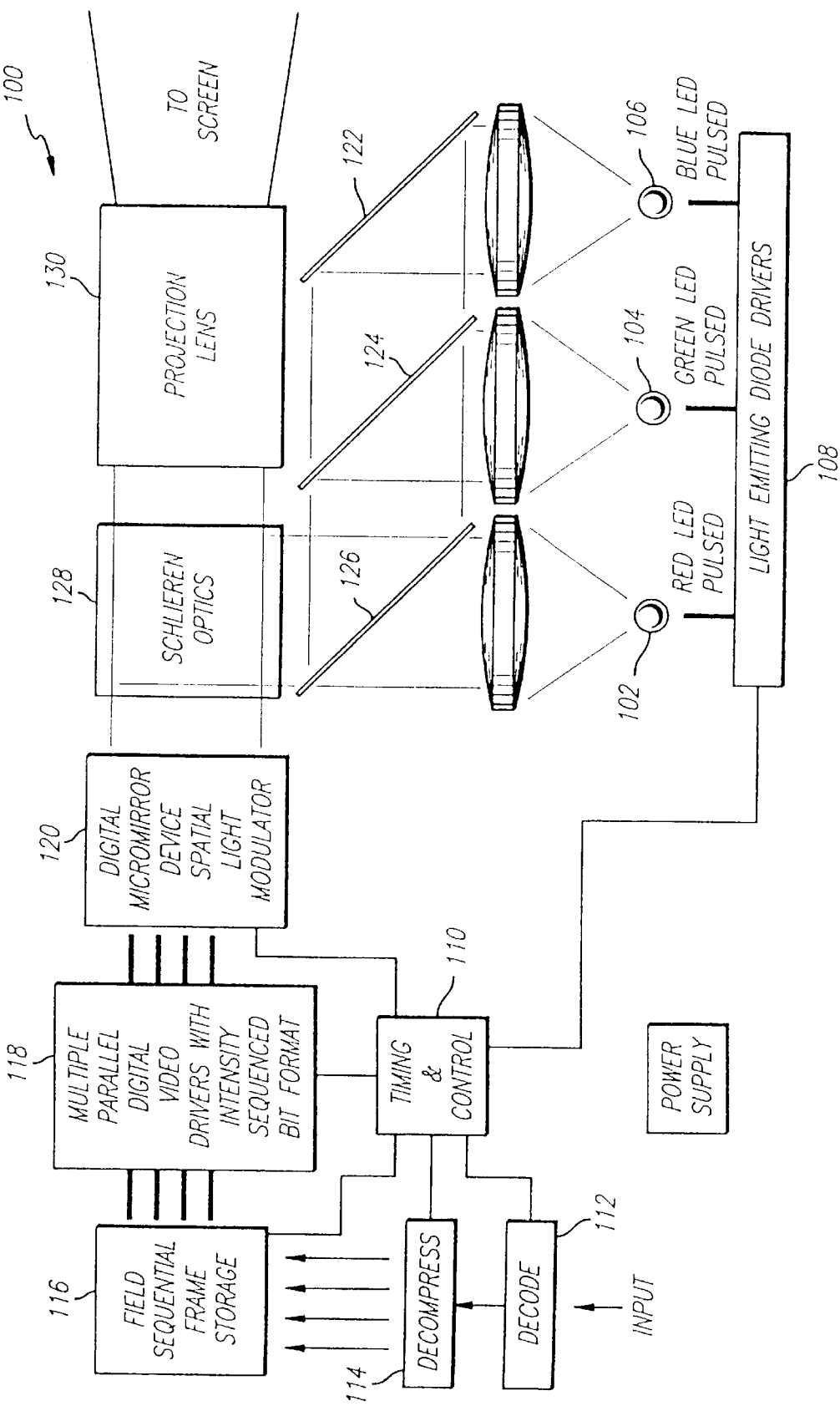
FIG. 7 shows mirror state as a fraction of frame time in accordance with conventional DMD mirror timing methodology.
Figure 8:
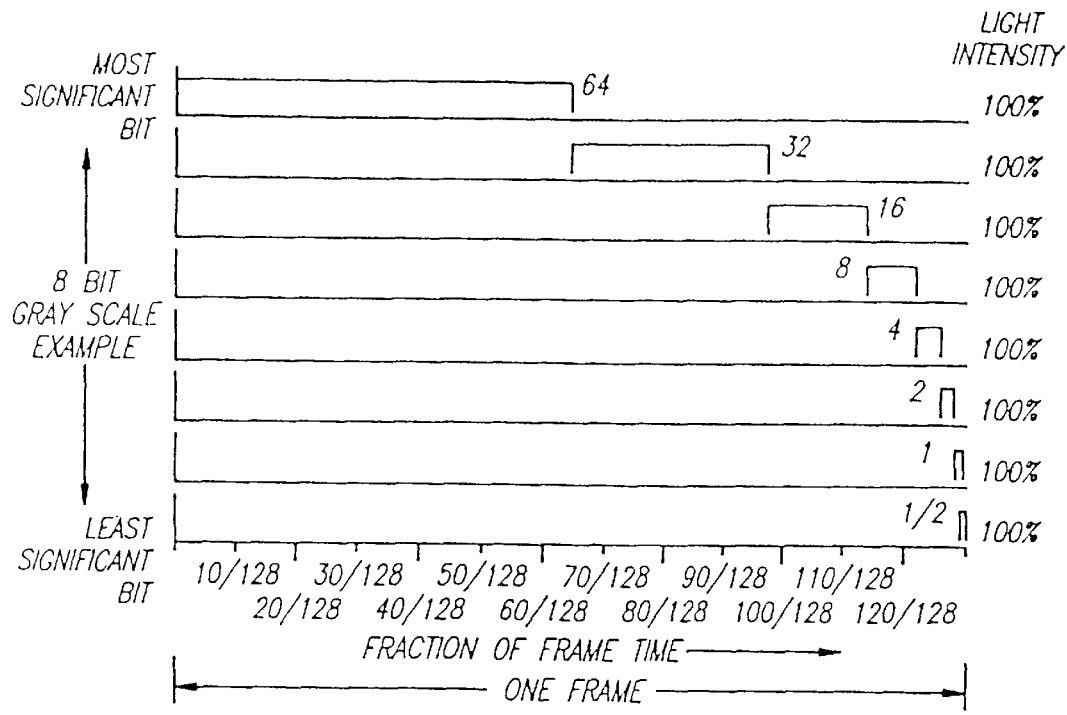
FIG. 8 depicts mirror state as a fraction of frame time in accordance with teachings of the present invention.

The advantages of the invention are apparent when the timing diagrams of FIGS. 5(a)–(f) and 6 (a)–(f) are compared. FIGS. 5 (a)–(f) and FIG. 7 are timing diagrams of a typical conventional DMD based image projection system. FIGS. 6 (a)–(f) and FIG. 8 are timing diagrams of a display constructed and operated in accordance with the teachings of the present invention. Each shows the time line of a single frame, consisting of several fields. FIGS. 5 (b) and 6 (b) indicate quantitatively the time duration of each field. FIGS. 5 (c) and 6 (c) indicate the points in time in which the mirror can transition from one state to another. The FIGS. 5 (d) and 6 (d) indicate the state of the illumination modulation. The FIG. 5 (e) and 6 (e) indicate the time available to load the new data into the DMD array, and the FIG. 5 (f) and 6 (f) indicate the point at which the new data is transferred into the individual pixel flip-flops.

In the conventional DMD image projection system, the illumination is constant, and the load times and mirror state duration are dictated by the need to accommodate the shortest field duration. FIG. 5 (a)–(f) shows such a system with six (zero through five) fields per frame; since the number of gray levels is (2 raised to the (number of fields-1)), this system would have fewer gray levels than a full 8-bit system. However, some DMD systems are limited to six bits by the conventional addressing method, since the seventh and eighth bits require even shorter writing times. FIG. 5 shows the time that is available to load in the new data for each field under the condition that it is set by the time available to load for the shortest field.

FIG. 7 indicates the time that is available to load in the new data for each field and suggests that the data rate could possibly be reduced by spreading the data load time over more than just one field. To the first approximation, providing additional memory at each picture element location so another field can be stored within the array would halve the data rate but double the complexity of the device, an undesirable trade-off. This invention teaches a method for reducing the data rate without increasing the array circuit complexity. In addition, the method described herein has the added advantage that it easily accommodates 8-bit video systems. In should be noted that in a conventionally illuminated DMD, the data rates are driven by the time available to load in the data for the shortest field, unless the data for multiple fields is stored within the array of the DMD, thus greatly increasing the complexity of the DMD.

In a conventional DMD image projection system, when eight bit video data is to be presented, the shortest field is 1/256×1/60 second. Furthermore, if the monochrome image is to have 1000 line resolution, the row enable pulse must be shorter than 1/256×1/60×1/1000, or 65 nano-seconds. For the same image in field sequential color, the row enable pulse must be three times faster, a 45 Mhz clock rate with a nominal 22 nanosecond pulse length. To produce a pulse whose rise and fall time is short relative to its 22 nanosecond duration requires a circuit with bandwidth of ten times the inverse of the pulse width, or roughly 450 Mhz for this example. Implementing circuitry with such a capability over the large area and multitude of connections usually associated with a display device would undoubtedly unfavorably impact yield and costs.

Reference is now made to FIGS. 6(a)–(f) and FIG. 8 which describe a frame interval as in FIGS. 5 (a)–f and FIG. 7, but where the illumination is modulated, and the field periods are equally spaced. In accordance with the present teachings, the only parameter that varies is the light source "on" time, as shown by FIG. 6(d), which is reduced by one-half for each successive field in any one frame.

In accordance with the present teachings, the duration of the light pulse during the first field, shown in FIG. 6 (d), is the full field period; the duration during the second field, shown in FIG. 6 (d) is half of the field period; and the duration is half again in each subsequent field until the beginning of the next frame when the process starts all over again. If the pixel is to present maximum brightness, it is on for all fields. If the pixel is to present the minimum non-zero brightness, the pixel is "on" only during the field in which the light source pulse is of minimum pulse width. If the pixel is to present a 50% gray shade, it on for the one field period when the light source is also on for the full period. All other gray scale levels can be achieved by suitable combinations of light pulse duration's.

Note that to simplify this illustration, the sum of series: 1/2, 1/4, 1/8, 1/16, 1/32, 1/64, 1/128, 1/256 was assumed to be 1, or unity, but in fact it is actually 0.9960938. Thus, the brightness of a pixel that is on for all eight fields, in a eight field frame, is actually 255 times the brightness of the minimum non-zero value. The durations of the light pulses can be trimmed slightly should it be necessary for the brightness levels to have precise binary time duration relationships.

As illustrated in FIG. 8, the time available to load new data is constant and equal to 1/N of the frame period, where "N" is the number of bits used for gray shade definition. In a system where eight bits are used for gray shade definition, the time available to load new field data is 16 times longer with the approach illustrated in FIG. 8 than the approach illustrated in FIG. 7. As a result, in actual practice it may not be necessary to use the entire field period to load the new data as illustrated in FIG. 6 (e).

Figure 9:
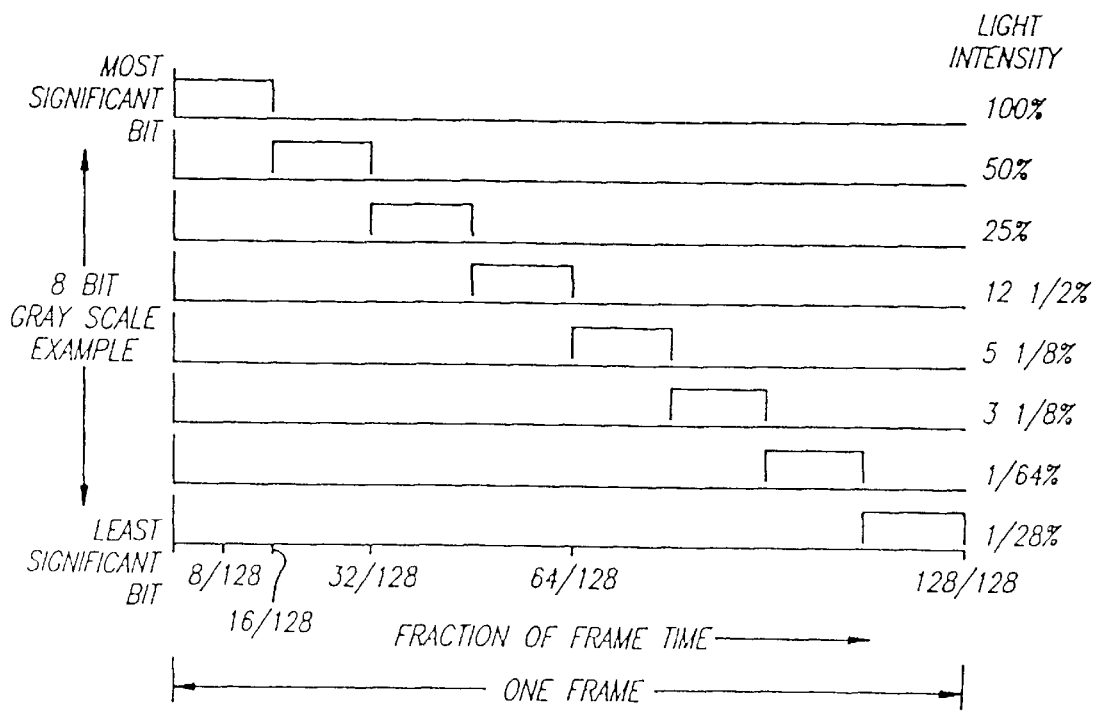
FIG. 9 is a simplified block diagram of an illustrative implementation of a field sequential color display system utilizing the teachings of the present invention.

FIG. 9 is a simplified block diagram of an illustrative implementation of a field sequential color display system utilizing the teaching of the present invention. As shown in FIG. 9, the system 100 includes first, second and third light sources 102, 104, and 106. Either light-emitting diodes (LEDs) or lasers may be used.

In a LED-based system, the first (red) light source 102 may be implemented with a commercial 5 mW light emitting diode (LED). The second (green) light source 104 may be implemented with a 1 milliwatt ZnSe/ZnTeSe LED in accordance with the teaching of D. B. Eason et al., in Electronics Letters 30, 1178 (1994). The third (blue) light source may be implemented with a 2 mW InGaN/AlGaN LED, as described by S. Nakamura et al., Applied Physics Letters 64, p. 1687 (1994).

In the alternative using lasers, green light at 532 nm may be obtained from a diode pumped 1.06 micron Nd:YAG laser that is doubled into the green by a KTP crystal, as described by L. R. Marshall et al. in Optics Letters 17, p. 1110 (1992). Blue light can be obtained by frequency-doubling either a diode pumped Nd:Yag laser at 946 nm or an InGaAs laser at 940 nm with a $KNbO_3$ crystal (E. Peik & H. Walther, Optics Letters 19, p. 192 (1994) or L. Goldberg et al., Electronics Letters 30, p. 1296 (1994)). Red light at 633 nm can be obtained from an AlInP/InGaP diode laser (R. S. Geels et al., Electronics Letters 28, p. 1043 (1992) or H. Hamada et al., Electronics Letters 27, p. 662 (1991)). In particular watts of light can be obtained currently from these lasers, corresponding to over 2000 lumens total in a color system.

Light sources (such as lasers) should be used that can be modulated fast enough such that their transition times are short compared to the narrowest illumination pulse, approximately 22 micro-seconds for a 60 Hz, 8-bit field sequential color system. The semiconductor light-emitting diodes (LEDs) in the first description above can be modulated up to the RC time constant, which for typically sized devices is above 100 MHz. The semiconductor light emitting diodes (LEDs) in the second description above includes a diode laser for the red with a similar upper limit. The green and blue laser sources involve frequency doubling in crystals or cavities. Methods to obtain fast modulation in such cavities have been discussed by W. J. Kozlovsky and W. Lenth (Optics Letters Vol. 19, p.195, 1994), by T. Senoh et al. (Appl. Phys. Lett. vol. 19, p.1172, 1992) and by L. Goldberg and D. Mehuys (Electronics Letters, vol. 30, p.1296, 1994).

Another alternative to turning the light sources "on" and "off" for periods corresponding to the different bits is to vary the intensity of the light. Thus by making the light ½ as bright for the second bit, ¼ as bright for the third bit, etc., the benefits of this invention can also be obtained.

Each of the light sources is driven by an LED driver circuit 108 with timing signals provided by a timing a control circuit 110. The timing and control circuit 110 also provides timing and control signals to an optional encryption decoder circuit (112), an optional image decompression circuit 114, a field sequential frame storage circuit 116, digital video drivers 118 and an image generator such as a DMD 120. The digital video drivers 118 may be implemented as in FIG. 4 with multiple row drivers 44, column drivers 46, parallel to serial converters 48 and video multiplexers 50, so as to provide the requisite sequenced bit format.

The output of the third (blue) light source 106 is reflected by an optional fold mirror through a first dichroic beam combiner 124 to a second dichroic beam combiner 126 where it is reflected into the Schlieren Optics 128. The Schlieren Optics may be implemented as in FIG. 1 with a lens 14 for collimating the illumination and a lens 17 for focusing the reflected light into an aperture 18. Similarly, the output of the second (green) light source 104 is reflected to the second dichroic mirror 126 by the first dichroic mirror 124. The second dichroic mirror reflects the light from the second source into the Schlieren Optics 128. Light from the first (red) light source 102 is transmitted through the second dichroic beam splitter directly to the Schlieren Optics 128.

The timing and control circuit 110 selectively activates each of the light sources 102, 104, and 106 while simultaneously coordinating and synchronizing the transfer of data into the DMD, so that a single DMD may provide gray scale and spatial modulation to the light sequentially provided by each of the three light sources. Light reflected from the DMD "on" pixels, as discussed herein, is passed by the Schlieren Optics to the projection lens 130 for reimaging on a screen (not shown) in the manner discussed above.

Thus, the present invention has been described herein with reference to a particular embodiment for a particular application. Those having ordinary skills in the art and access to the present teachings will recognize additional modifications applications and embodiments within the scope thereof. For example, the invention is not limited to the modulation of the mirrors with input data. In the alternative, or, in addition, the modulation of the light source may be responsive to input data.

It is therefore intended by the appended claims to cover any and all such applications, modifications and embodiments within the scope of the present invention.

Accordingly,

What is claimed is:

1. A system for directing intensity modulated electromagnetic energy comprising:

an intensity modulated light source modulated in intensity in accordance with a predetermined intensity modulation scheme in which a frame interval comprises a plurality of field periods each associated with a different intensity;

a spatial light modulator for directing light from said source, said spatial light modulator including and array of energy directing elements, selected ones of said elements being selectively activated during each of the field periods in synchronism with said predetermined modulation scheme; and a timing and control circuit to selectively activate the selected elements of said spatial light modulator in response to a first signal representative of data within a single said frame interval and further operable to modulate said source in response to a second signal representative of individual said field periods within said single frame interval, wherein the first and second signals are synchronized to provide an overall system dynamic range greater than an effective dynamic range associated with said spatial light modulator.

2. An image projection system comprising the electromagnetic energy intensity directing system of claim 1 wherein:

said system further comprises a display surface to display light directed toward it by said spatial light modulator.

3. The system of claim 1, wherein:

said system further comprises an electronic means for providing said first and said second signals; and said first signal and said second signal each comprise n fields per frame.

4. The system of claim 3, wherein:

the intensity of said source is reduced by one-half during each successive field.

5. The system of claim 3, wherein:

said source is activated during an entire first field and for each successive field, said source is activated for ½ of the time said source is activated during the preceding field.

6. The system of claim 3, wherein:

the intensity of said source is doubled during each successive field.

7. The system of claim 6, wherein:

said source is active for minimal time during a first field and during each successive field said light source is activated for twice the time said light source is activated during said preceding field.

8. The invention of claim 1 wherein:

said source is laser, and said laser is intensity modulated at video frame rates to thereby provide gray scale encoding of a video image.

9. The invention of claim 1 wherein:

said source is incandescent, and said incandescent source is intensity modulated at video frame rates to thereby provide gray scale encoding of a video image.

10. A full color sequential image projection system comprising:

first, second and third intensity modulated light sources, each said source being modulated in intensity by a predetermined intensity modulation scheme in which a frame interval comprises a plurality of field periods each associated with a different combination of intensity and source;

a spatial light modulator for sequentially directing intensity modulated light from each of said sources, said spatial light modulator including an array of light directing elements, selected ons of said light directing elements being selectively activated during each of the field periods in synchronism with said predetermined modulation scheme;

a timing and control circuit to selectively activate the selected elements of said spatial light modulator in response to a first signal representative of data within a single said frame interval and further operable to selectively activate each of said sources in response to a respective second signal representative of individual said field periods within said single frame interval; and means for projecting the modulated light directed by said spatial light modulator onto a display surface, wherein the first signal and the second signals are synchronized to provide an overall system dynamic range greater than the dynamic range of said spatial light modulator.

11. A method for directing energy including the steps of:

providing a source of intensity modulated energy of varying intensity to provide a continuum of intensity levels extending from fully off to fully on in accordance with a predetermined intensity modulation scheme, directing the intensity modulated energy onto an array of energy directing elements, modulating said source in response to a first signal representative of said predetermined modulation scheme, selectively activating said energy directing elements in response to a second signal representative of data; and synchronizing the first and second signals to provide an overall system dynamic range greater than the dynamic range of said array.

* * * * *